United States Patent
Kuo

(10) Patent No.: US 10,750,117 B1
(45) Date of Patent: Aug. 18, 2020

(54) METHOD AND APPARATUS FOR TRANSMITTING AND RECEIVING AUDIO OVER ANALOG VIDEO TRANSMISSION OVER A SINGLE COAXIAL CABLE

(71) Applicant: Techpoint, Inc., San Jose, CA (US)

(72) Inventor: Feng Kuo, San Jose, CA (US)

(73) Assignee: Techpoint, Inc., San Jose, CA (US)

( * ) Notice: Subject to any disclaimer, the term of this patent is extended or adjusted under 35 U.S.C. 154(b) by 0 days.

(21) Appl. No.: 16/129,468

(22) Filed: Sep. 12, 2018

(51) Int. Cl.
*H04N 7/04* (2006.01)
*H04N 7/06* (2006.01)
*H04N 7/083* (2006.01)

(52) U.S. Cl.
CPC ..................... *H04N 7/04* (2013.01)

(58) Field of Classification Search
CPC ...... H04N 7/04; H04N 21/43632; H04N 5/38; H04N 5/60
USPC ......... 348/461, 462, 423.1, 473, 476, 434.1, 348/482, 465
See application file for complete search history.

(56) References Cited

U.S. PATENT DOCUMENTS

| | | | |
|---|---|---|---|
| 9,531,980 B2 | 12/2016 | Yin et al. | |
| 2004/0095509 A1* | 5/2004 | Okamoto | H04N 7/04 348/462 |

\* cited by examiner

*Primary Examiner* — Jefferey F Harold
*Assistant Examiner* — Jean W Desir
(74) *Attorney, Agent, or Firm* — Pillsbury Winthrop Shaw Pittman LLP

(57) ABSTRACT

A method and system for transmitting and receiving an audio signal over a video signal in a single cable. The method and system including receiving an analog video signal, the analog video signal comprising one or more rows of video data, an audio header, and one or more quantized audio data. The method includes detecting, the audio header in a blank interval of the analog video and determining a reference level of the audio header. The method and system include extracting, in response to detecting the audio header, the one or more quantized audio data and converting the one or more quantized audio data to an original value of audio data based on the reference level of the audio header. The method and system are configured for storing the one or more quantized audio data in the original value in a First-in-First-Out (FIFO) buffer, and reconstructing, utilizing the FIFO buffer, a continuous audio signal from the one or more quantized audio data in the original value.

13 Claims, 5 Drawing Sheets

METHOD AND APPARATUS FOR TRANSMITTING AND RECEIVING AUDIO OVER ANALOG VIDEO TRANSMISSION OVER A SINGLE COAXIAL CABLE

FIELD OF THE INVENTION

The present invention relates in general to digital video transmission and in particular to methods and apparatuses for transmitting and receiving audio over analog video transmission over a single coaxial cable.

BACKGROUND OF THE INVENTION

It is apparent when it comes to the need to send both analog video and audio data over a distance; one cable is better than two cables in terms of cost and complexity. Various methods and apparatuses have been proposed to reduce the cost and complexity of sending both analog and video signal by transmission over a single coaxial cable. To avoid interference between the analog video and audio data on a single cable, there are potentially two ways to get the required separation. Frequency multiplexing audio data and video data and transmitting each data signal over distinct non-overlapping frequency band is known. Interleaving an audio signal and a video signal in the time domain thereby having the video and audio data present in the signal at different times without interfering with each other is known. Interleaving audio data when active video is not present during the video-blanking is also known. However, current signaling protocols are complex and require intensive calculation for interleaving audio data in with video data.

For example, U.S. application Ser. No. 14/442,803 of Zhejiang Dahua Technology Co., Ltd. discloses a method of and apparatus for transmitting a high-definition video signal to address the problem in the prior art, i.e., the cost and complexity of transmitting analog and audio over a distance using a single coaxial cable. In particular, the '803 applications proposed to buffer audio data by calculating an audio duration for every each row in the video frame that audio data is superimposed. However, the proposed method of the '803 application creates the need to for calculating and storing an audio duration size in every active row of video data. Doing so requires storing and buffering audio durations that are not small and require burdensome buffering and storage requirements, which complicates the coding scheme. The exemplary implementations described herein do not require calculating the number of audio samples to be stored in the buffer and transmitted per frame basis and employs much smaller buffer, reducing cost of manufacture and operating power requirements.

Accordingly, there remains a need in the art for a solution that addresses the problems discussed above among others.

SUMMARY OF THE INVENTION

The present invention relates generally to a method and system for transmitting digital video and audio data over a transmission medium in analog form using a single coaxial cable. More specifically, the present invention discloses a method or apparatus for efficiently transmitting audio data in a video blanking period of an analog video signal in a manner that does not require intensive calculation of the audio duration on a row by row basis.

According to one aspect of the invention the method of the present invention may include receiving an analog audio signal and quantizing the analog audio signal in digital format to result in a plurality of quantized audio data. The method includes buffering one or more of the plurality of quantized audio data and receiving a video signal that includes a blank interval and at least one portion of video data disposed therein. In some embodiments, the method includes generating one or more quantized audio pulses corresponding to the one or more of the plurality of quantized audio data stored in the buffer and an audio header corresponding to the one or more quantized audio pulses. The method includes identifying, without calculating, at least one permissible portion of the blank interval corresponding to a first duration exceeding a predetermined duration of the audio header and the one or more quantized audio pulses. The method may conclude, in some embodiments, by multiplexing, in the at least one permissible portion of the blank interval, the audio header and the one or more audio pulses, with the at least one portion of video data resulting in a combined audio and video signal that represents at least a portion of the audio and video data.

According to another aspect of the invention a method of the present invention may include receiving an analog video signal, the analog video signal including an audio header and one or more quantized audio pulses corresponding to quantized audio data, and detecting the audio header in a blank interval of the analog video. In some embodiments, the method includes, determining a reference level of the audio header, and extracting, in response to detecting the audio header, the one or more quantized audio pulses. In some embodiments, the method includes converting the one or more quantized audio pulses to an original value of the one or more quantized audio data based on the reference level of the audio header and storing the one or more quantized audio data in the original value in a First-in-First-Out (FIFO) buffer. In some embodiments, the method includes reconstructing, utilizing the FIFO buffer, continuous audio data from the one or more quantized audio data in the original value.

According to yet another aspect of the invention the method of the present invention may include receiving an analog video signal including an audio header and one or more of a plurality of quantized audio pulses corresponding to a plurality of quantized audio data that was placed in a blank portion of the analog video portion based upon a calculation performed by an upstream transmitter, detecting the audio header, and determining a reference level of the audio header. In some embodiments, the method includes extracting, in response to detecting the audio header, the one or more of the plurality of quantized audio pulses and converting the one or more of the plurality of quantized audio pulses to an original value of the plurality of quantized audio data based on the reference level. In some embodiments, the method includes storing the one or more of the plurality of quantized audio data in the original value in a First-in-First-Out (FIFO) buffer and reconstructing, utilizing the FIFO buffer, a continuous audio signal from the one or more of the quantized audio data in the original value.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
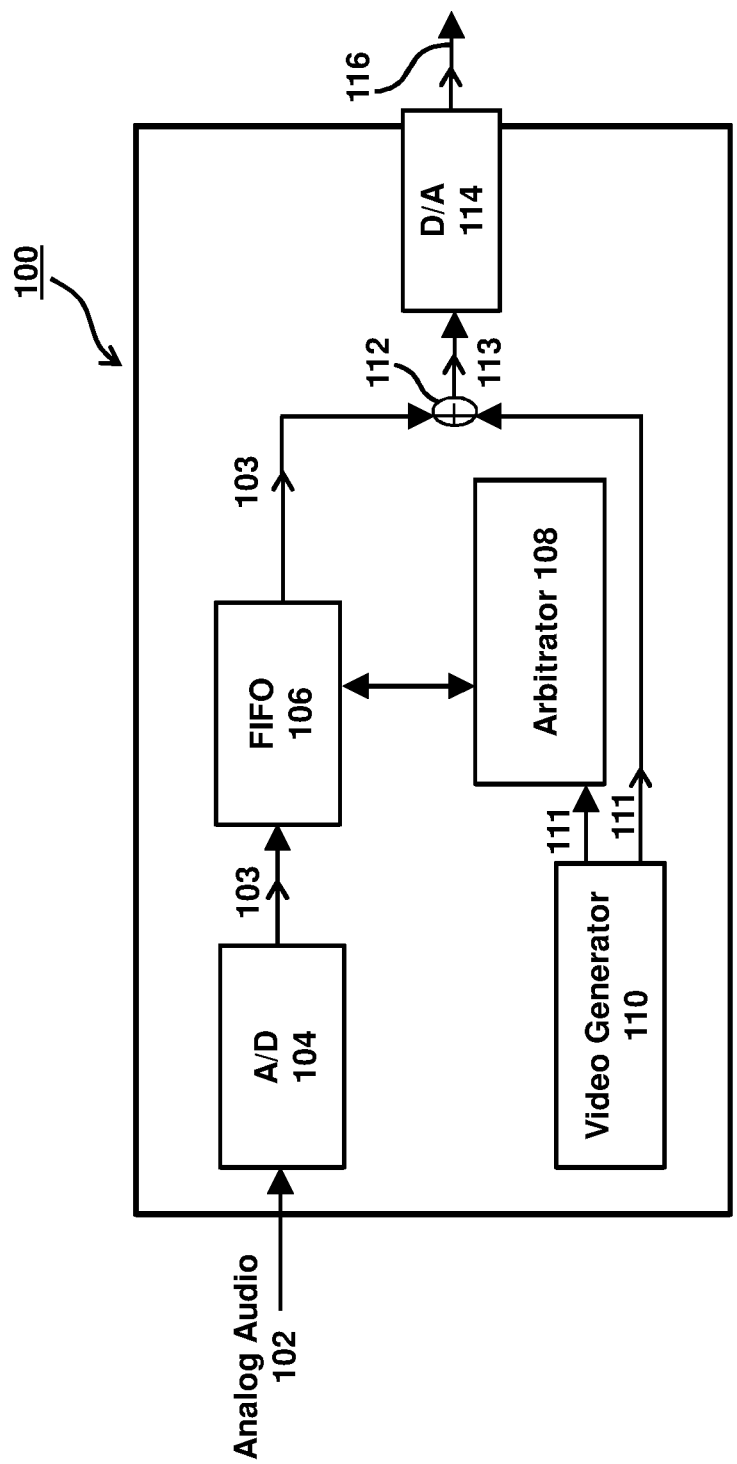
FIG. 1 illustrates a block diagram of an exemplary audio transmitter in accordance with one or more embodiments of the invention.

FIG. 1 illustrates an audio encoder system 100 on the transmitter side where an embodiment of the present invention is applicable. As shown in FIG. 1, system 100 includes analog-to-digital converter (ADC) 104, buffer 106, arbitrator 108, video generator 110, signal combiner 112 and digital-to-analog converter (DAC) 114. In an exemplary embodiment, system 100 is configured to receive a continuous analog audio signal 102 and process analog audio signal 102 for transmission along with video signal 111, via a single transmission line.

In one embodiment, ADC 104 may be configured to receive analog audio signal 102 and sample analog audio signal 102 at a predetermined frequency. In one embodiment, the audio sampling rate may be set at less than a video line rate of video signal 111, doing so may prevent overflow in buffer 106. ADC 104 may be configured to output quantized audio data 103 corresponding to the sampled analog audio signal 102. In one embodiment, ADC 104 may be configured to sample audio signal 102 at 8 kHz. In another embodiment, ADC 104 may be configured to sample audio signal 102 at 16 kHz. In yet another embodiment, ADC 104 may be configured to sample audio signal 102 at 32 kHz.

In some embodiments, ADC 104 may be configured to receive audio signal 102, sample and quantize the analog audio signal 102 in digital format resulting in quantized audio data 103. In some embodiments, buffer 106 may be configured for buffering quantized audio data 103. Buffer 106 may be configured to receive quantized audio data 103 from ADC 104 and store entries until a video blanking period becomes available, which is discussed in further detail below. In one embodiment, buffer 106 may include a first-in-first-out (FIFO) buffer configured to not alter the order in which quantized audio data is received and transmitted by buffer 106. In another embodiment, buffer 106 may be configured to timestamp incoming quantized audio data. In one embodiment, in response to buffering quantized audio data 103, buffer 106 may be configured to notify arbitrator 108 that quantized audio data is available in buffer 106. In one embodiment, buffer 106 may be configured to include interrupt I/O circuitry in communication with arbitrator 108. In another embodiment, arbitrator 108 may include polling I/O circuitry configured to poll buffer 106 to determine the presence of quantized audio data 103 in buffer 106.

In some embodiments, arbitrator 108 analyzes video signal 111 to determine the timing and presence of the video blanking interval of video signal 111, which is discussed in further detail below. In one embodiment, in response to the polling and/or interrupt, arbitrator 108 may be configured to determine the availability of a video blanking period (not shown in FIG. 1) of video signal 111. In one embodiment, video signal 111 includes a blank interval and at least one portion of video data disposed therein. In one embodiment, the video blanking interval may include a horizontal sync pulse, a vertical sync pulse, a color sync pulse, and/or other data corresponding to video data of video signal 111. In another embodiment, the video blanking interval does not contain any sync pulses and/or other data corresponding to video data of video signal 111, and arbitrator 106 may be configured to insert sync pulses in a predetermined location of the video blanking interval based on a predefined video format, which is discussed in further detail below.

In some embodiments, in response to determining the timing and presence of the video blanking interval, arbitrator 108 may be configured to command buffer 106 to transmit quantized audio data 103 corresponding to the availability of a video blanking period of video signal 111. When buffer 106 does not contain data entries (i.e., quantized audio data 103) at the time of determining the presence of the video blanking interval, the row will be skipped until there are entries stored in buffer 106. In one embodiment, arbitrator 108 may include synchronization circuitry including one or more clocking circuits that processes video signal 111 and performs task management protocol for interleaving quantized audio data 103 with the video blanking period of video signal 111. In one embodiment, arbitrator 108 may be configured to fetch or retrieve the quantized audio data from buffer 106.

In one embodiment, arbitrator 108 may be configured to receive digital video signal 111 from video generator 110. Arbitrator 108 may be configured to check for the availability of quantized audio data 103 stored in buffer 106 in response to approaching the blank interval time of video signal 111. In response to determining that quantized audio data 103 is available in buffer 106, arbitrator 108 may generate one or more sync pulses, one or more quantized audio pulses corresponding to quantized audio data 103 stored in buffer 106, and an audio header describing the one or more quantized audio pulses. In one embodiment, the header may indicate the presence of audio data and may be utilized for decoding audio on a receiver end, which is discussed in further detail below. In one embodiment, arbitrator 108 may be configured to insert one or more sync pulses based on a predefined video protocol, which is discussed in further detail below.

In one embodiment, video generator 110 may be configured to generate digital video signal 111, and output video signal 111 to arbitrator 108 and signal combiner 112. In another embodiment, video generator 110 may relay an existing video signal received from a video source (not shown). In some embodiments, video generator 110 may be configured to output video signal 111, which may be configured as 8-bit, 10-bit or 12-bit 4:4:4 or 4:2:2 YUV data. In some embodiments, video signal 111 may be configured using other sub-sampled formats. In some embodiments, video generator 110 may include one or more analog processors, chrominance processor, luminance processor, clocking circuitry, and a host communication interface (not shown in FIG. 1).

As discussed above, arbitrator 106 may be configured to determine the availability of a video blanking period of video signal 111. In some embodiments, arbitrator 106 may include processing circuitry and memory storing firmware and/or other types of non-transitory computer readable instructions thereon. Arbitrator 106 processing circuitry may be configured to execute instructions contained in the firmware and/or memory for implementing the exemplary embodiments described herein. In some embodiments, processing circuitry within arbitrator 106 may include one or more hardware processors, one or more field programmable gate arrays (FPGA), alone and/or in combination.

In one embodiment, arbitrator 106 may be configured to manage timing for interleaving and/or inserting quantized audio data 103 stored in buffer 106 with video signal 111 via clocking functionality (not shown in FIG. 1). In some embodiments, arbitrator 106 may include clocking functionality for synchronizing quantized audio data 103 with video signal 111. Arbitrator 106 may include one or more digital signal processors (DSP), field programmable gate arrays (FPGA) and or application specific integrated circuits (ASIC). In one embodiment clocking circuitry of arbitrator 108 may include one or more of phase locked loop (PLL) clock, a non-PLL clock, a quartz crystal oscillator, and LC resonance tank circuit, alone and/or in combination. Clocking circuitry may include additional timing and signal conditioning functionality including, for example, fan-out buffers, multipliers and dividers, synthesizers, alone and/or in combination.

As shown in FIG. 1, signal combiner 112 may be configured to receive quantized audio data 103 from buffer 106 and video signal 111 from video generator 110. Signal combiner 112 may be configured to interleave quantized audio data 103 in the video blanking period of video data 111, which is described in further detail below. In one embodiment, signal combiner 112 may be configured to interleave quantized audio data 103 with video signal 111 by inserting quantized audio data 103 into the video blanking portion of video signal 111, and output a combined audio and video (A/V) digital signal 113 to digital-to-analog converter (DAC) 114.

In some embodiments, DAC 114, may include an 8 bit DAC, a 10 bit DAC, or of any higher bit width and operating at a specific frequency as required by video signal 111. For example, DAC 114 may run at 148.5 MHz, which is two times an input data rate of a standard HD digital video (e.g., 1080p30/25 and 720p60/50). In some embodiments, the amplitude of the DAC output signal can be set by an external current setting resistor (not shown in FIG. 1). DAC 114 may be configured to receive A/V signal 113 from signal combiner 112 in digital format, convert combined audio and video signal 113 to analog format, and output an analog audio and video (A/V) signal 116 for transmission via a single transmission line (not shown in FIG. 1). In one embodiment, the signal transmission line may be a coaxial cable configured to transmit analog signal via one or more fiber optic cables and/or twisted pair wire transmission lines.

In one embodiment, video signal 111 may include a resolution of 1280×720p. Video blanking interval 210 may correspond to the video blanking period of a 1280x720P video signal. Video signal 111 may include streaming video frames, each frame including 1650 pixels per line with 1280 active video pixels. In one embodiment the blank interval of video signal 111 includes 370 pixels configured to contain the horizontal sync pulse, vertical sync pulse, color sync pulse, and/or other data corresponding to the video data.

In one embodiment, for example, video signal 111 may correspond to the SMPTE 296M standard, wherein a 1280x720P video frame has 750 horizontal lines or rows, of which 30 lines are a vertical blanking interval that do not contain video data. According to the numbering scheme of SMPTE 296M, lines 26-745 are active video frame data. Both active frames and vertical blanking intervals may include a respective video blanking interval 210. The video blanking interval may be the same size for each row of video signal 111 due to the periodic nature of the video blanking interval. In other embodiments, video signal 111 may correspond to other SMPTE standards including but not limited to: 259M, 344M, 292M, 372M, 424M, ST-2081, ST-2082, and/or ST-2083. It should be noted that the exemplary embodiments described herein are not limited to the line numbering scheme as described above. A person of ordinary skill in the art can apply the principal of the invention to any other numbering scheme after reading the 'disclosure provided herein.

In some embodiments, arbitrator 108 in conjunction with signal combiner 112 may be configured to generate one or more quantized audio pulses (not shown in FIG. 1) corresponding to the one or more of the plurality of quantized audio data 103 stored in buffer 106 and an audio header corresponding to one or more quantized audio pulses (not shown in FIG. 1). In some embodiments, arbitrator 108 may be configured to cause buffer 106 to transmit the audio header to signal combiner 112, along with quantized audio data 103, for multiplexing into combined A/V signal 113. In one embodiment, signal combiner 112 and arbitrator 108, may utilize time division multiple access (TDMA) multiplexing protocol in order to combine quantized audio data 113 and video signal 111, which is described in further detail below.

Figure 2:
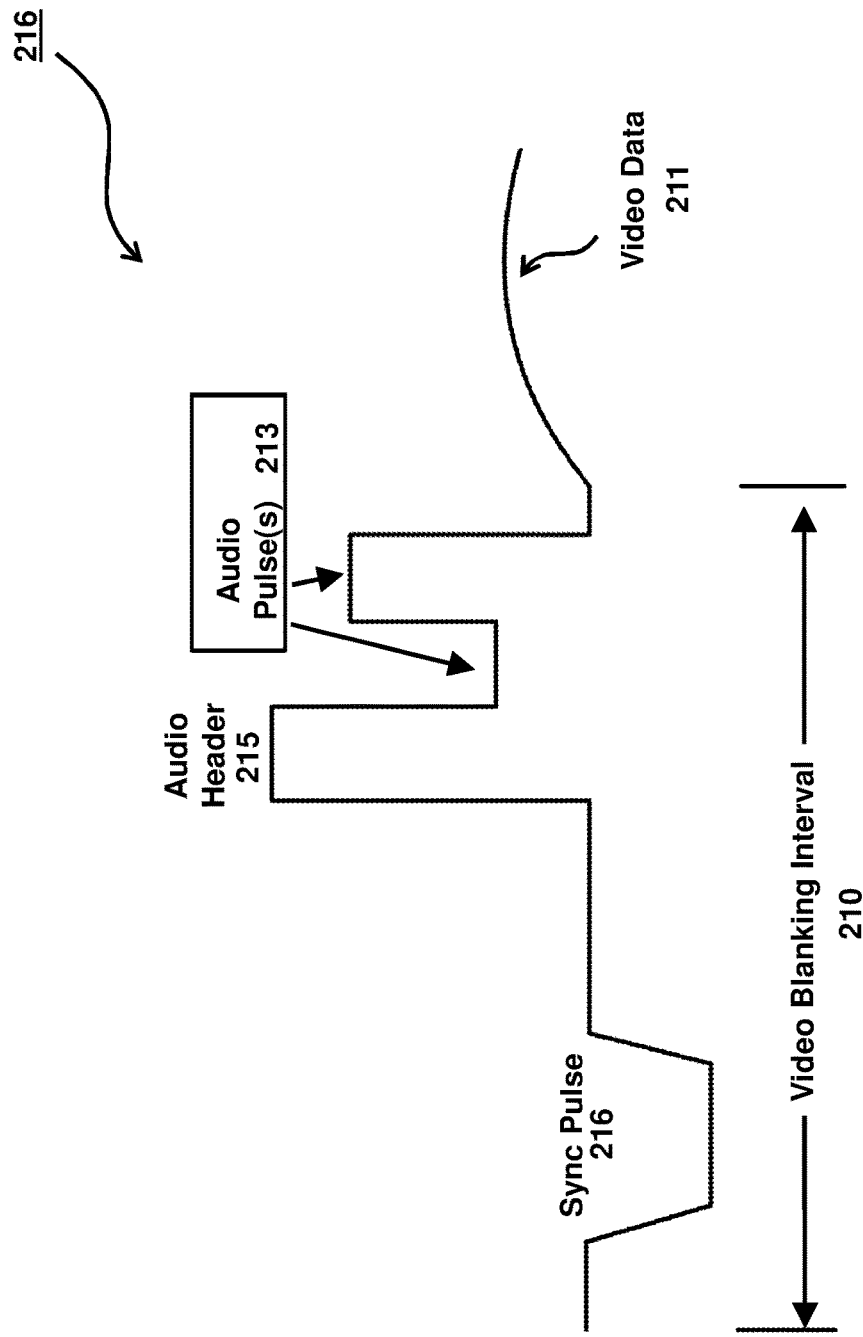
FIG. 2 illustrates a schematic diagram for an output analog video signal in accordance with one or more embodiments of the invention.

Referring now to FIG. 2 in conjunction with FIG. 1, FIG. 2 illustrates an exemplary A/V signal 216 according to one or more embodiments. A/V signal 216 may correspond to A/V signal 116 of FIG. 1. In some embodiments, A/V signal 216 depicted in FIG. 2 may correspond to a single active row of a single video frame of video signal 111. As shown in FIG. 2, A/V signal 216 may include video data 211 and video blanking interval 210. Video data 211 may correspond to video data of video signal 111 generated or received by video generator 110, as discussed above. Video blanking interval 210 of combined A/V signal 116, 216 may include one or more audio pulses 213, audio header 215, and sync pulse 216. As shown in FIG. 2, video blanking interval 210 may exist before and after sync pulse 216. In some embodiments, sync pulse 216 may include a horizontal sync pulse, vertical sync pulse, color sync pulse, and/or other data corresponding to CODEC of video signal 116, 216.

In some embodiments, arbitrator 108 may be configured to determine a sync pulse location of a sync pulse 216 in the video blanking interval 210. Arbitrator 108 may be configured for identifying, without calculating, at least one permissible portion of the blank interval corresponding to a first duration exceeding a predetermined duration of the audio header and the one or more quantized audio pulses.

In another embodiment, arbitrator 108 may be configured for identifying, without calculating, a sync portion configured to include one or more sync pulses based on a pre-defined video standard, the sync portion differing from the at least one permissible portion of the blank interval. In some embodiments, A/V signal 216 may include sync pulses and/or other data corresponding to video data 211 in video blanking interval 210. In one embodiment, identifying a sync pulse location may include digitizing an existing analog video signal (e.g., via ADC 104) and identifying the sync pulse location and blanking intervals from the digitized video stream.

In another embodiment, video signal 111 may include a pre-defined digital format having a video blanking interval that is devoid of sync pulses, and identifying the sync pulse locations may include communication between a video encoder (e.g., signal combiner 112) and audio arbitrator 108 regarding where (i.e., a temporal location) sync pulses 216 will be inserted according to the pre-defined video standard. In some embodiments, arbitrator 108 may include an audio encoder and/or a video encoder (not shown) having a pixel counter. Utilizing the pixel counter, arbitrator 108 may identify insertion locations for sync and audio data that are predefined based on the count value of the pixel counter.

In one embodiment, because the transmission of digital video signal in digital format does not require sync or color sync data, identifying the sync pulse location and blank intervals portions that are devoid of sync pulses may include communication between the video encoder (e.g., combiner 112) and audio arbitrator 108 regarding where the sync pulse 216 will be inserted according to a pre-defined video standard. Thus, determining a sync pulse location may include determining one or more portions of video blanking interval 210 that is/are free of any video related signals corresponding to video data 211 (e.g. horizontal/vertical/color sync pulse and/or other data corresponding to vide data 211). Analog video transmission, however, includes sync pulses and digitizing the analog video stream (e.g., via ADC 104) may identify the temporal location of sync pulses present in video data 211. In another embodiment, arbitrator 108 may be configured to determine a location of other data in the blanking interval (e.g., horizontal/vertical/color sync pulse and/or other data corresponding to video data 211) based on a predefined video format.

In some embodiments, video blanking interval 210 may include audio header 215 and one or more quantized audio pulse(s) 213. A single quantized audio pulse 213 may correspond to one digitized audio data (e.g., in 8/10/12/16 bit format) stored as one buffer entry. The level of audio pulse 213 (i.e. amplitude or voltage level) may linearly represent the digital data corresponding to quantized audio data 103 stored in buffer 106. In one embodiment, for example, in the case of an 8-bit sample data, 00 hex may include the lowest level of audio pulse(s) 213 and FFhex may include the highest level of audio pulse(s) 213. In some embodiments, other hexadecimal leveling protocol may be utilized for various video formats without diverting from the scope of the present embodiments described herein. In some embodiments, the duration of quantized audio pulse(s) 213 may be pre-defined based on the particular video format of signal 116, 216.

As shown in FIG. 2, audio header 215 and quantized audio pulses 213 each include a predetermined pulse duration (i.e., pulse width). Audio pulses may be distorted at the far end (i.e., receiver side) of the cable due to imperfect frequency response, thus pulse duration must be chosen accordingly. In some embodiments, the duration of each audio pulse 213 may be programmable and predetermined for each video format based on the blank space available and the cable length. Each video blanking interval 210 of signal 216 may have the same size/duration due to the periodic nature of the video blanking interval in each row of every frame of video signal 216. Thus, the duration or pulse width of quantized audio pulses 213 and audio header 215 may be pre-defined for certain video formats in a manner such that at least one audio header 215 and one quantized audio pulse 213 duration can fit in blanking interval 210. In some embodiments, based on the particular pre-defined video format, the duration of audio header 215 and quantized audio pulses 213 are selected such that video blanking interval may include at least two quantized audio data pulses 213.

For example, some video formats (e.g., SMPTE standards discussed above) may include a wider video blanking interval that provides sufficient space for more than one quantized audio pulse 213. In some embodiments, in order to accommodate inserting two or more quantized audio pulses 213 in each blanking interval 210, the pulse duration of quantized audio pulses 213 and/or audio header 215 may be selected more narrowly, based on the duration of video blanking interval 210 of the particular video format. Doing so may increase the transfer data rate when two or more audio pulses 213 can be inserted into video blanking interval 210.

As discussed above, quantized audio pulses 213 may include an analog representation of quantized audio data 102 stored in buffer 106 in reference to the header level of audio header 215. In some embodiments, audio header 215 may include a maximum signal value or a mid-level signal value of audio quantized audio pulses 213. In one embodiment, audio header 215 may be configured to serve as a flag to indicate valid audio data and as a reference level to decode quantized audio pulses 213 and reconstruct audio data to an original format by a downstream receiver, which is discussed in further detail below in the discussion of FIG. 3

In one embodiment, audio header 215 may correspond to a voltage level that is distinct from video blanking interval 210 and may be readily identified by a downstream video receiver. The voltage level of audio header 215 may be configured to be readily differentiated in video blanking interval 210 and facilitates the determination by a downstream receiver that a particular video blanking interval 210 contains no audio data. In one embodiment, audio header 215 includes a zero audio level or an integer multiple of a zero audio level. The audio header may serve as a zero reference for decoding quantized audio pulses 213 into a bi-directional AC wave. In some embodiments, the one or more quantized audio pulses 213 are superimposed (i.e. interleaving or multiplexing) with a DC offset.

In one embodiment, audio header 215 may correspond to the DC offset during transmission, wherein audio header 215 may be utilized for recovering the DC offset in a downstream video receiver. During transmission of signal 216, the voltage level of audio pulses 213 can change for various reasons. The quantization level on a receiver side may also be different than the original DAC conversion level. Therefore, two distinct levels are needed to accurately recover the audio digital value of audio pulses 213. Thus in some embodiments audio header 215 may correspond to a predefined header level and the video blank level for reference to scale the received audio level accordingly. Thus, in some embodiments, audio header 213 may contain a DC offset plus a value that is half or full amplitude of the audio signal to aid the decoding by a downstream transmitter, for example, as discussed in FIG. 3 below.

In some embodiments, arbitrator 108 in communication with signal combiner 112 may be configured to interleave audio header 215 and one or more audio samples 213 at a predetermined time in video blanking interval 210. In one embodiment, interleaving may include multiplexing, in the permissible portion of blank interval 210, audio header 215 and one or more audio pulse(s) 213, with the at least one portion of video data 211 resulting in a combined audio and video signal 216 that represents at least a portion of the audio and video data. While FIG. 2 depicts audio header 215 and audio samples 213 located between video data 211 and sync pulse 216, in some embodiments, header 215 and audio samples(s) 213 may be inserted before or after sync pulse 216. In some embodiments, audio header 215 and audio samples 213 may be included both before and after sync pulse 216.

Figure 3:
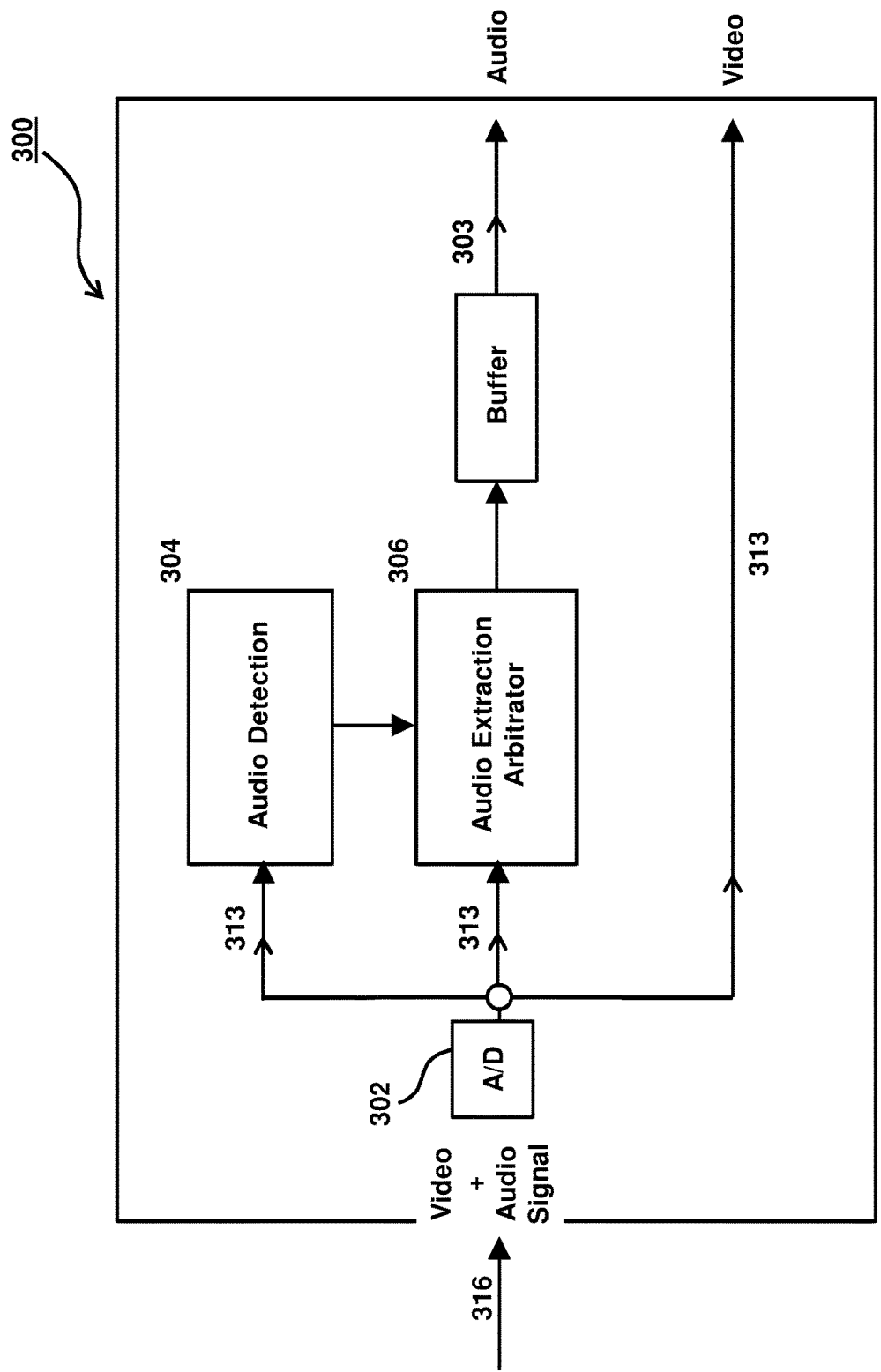
FIG. 3 illustrates a block diagram of an exemplary audio receiver in accordance with one or more implementations.

Referring now to FIG. 3, in conjunction with FIGS. 1 and 2, FIG. 3 depicts an exemplary audio decoder system 300 corresponds to the audio encoder system 100 of FIG. 1. Audio decoder system 300 in conjunction with audio encoder system 100 may comprise an audio/video CODEC system. Decoder system 300 may include ADC 302, audio detection module 304, audio extraction module 306, and FIFO buffer 303. As shown in FIG. 3, ADC 302 may be configured to receive A/V signal 116, 216, 316 in analog format and convert analog A/V signal 116, 260, 316 into the digital domain. ADC 302 may be configured to output A/V signal 116, 216, 316 in digital format as a digital A/V signal 313. ADC 302 may be configured to output A/V signal 313 to audio detection module 304, audio extraction arbitrator 306, and a video destination (not shown in FIG. 3). In some embodiments, decoder system 300 may be configured to receive an analog video signal 116, 216, 316 including audio header 215 and quantized audio pulses 213 that was placed in a video blanking interval 210 of the analog video signal 116, 216, 316 based upon a calculation performed by an upstream transmitter.

In some embodiments, audio extraction arbitrator 306 may include a video decoder sync slicer (not shown in FIG. 3). Detecting the presence of an audio header may include utilizing information from the sync slicer function of a video decoder to aid the detection of audio header 215 at one or more predefined locations/time intervals according to the video transmission protocol and resolution of A/V signal 313. In one embodiment the sync position detection may provide a predetermined search range for detecting the presence of an audio header. The search range may include a time interval of video signal 111 which includes the video blanking interval. In other embodiments other functionality of the video decoder may aid in the detection of audio header 215.

In some embodiments, audio detection module 304 may be configured to detect the presence of audio header 215 contained in video blanking interval 210. In response to detecting audio header 215, audio detection module 304 may be configured to communicate the presence of audio data to the audio extraction arbitrator 306. In response, audio extraction arbitrator 306 may be configured to extract audio samples 213 from video blanking portion 210, by extracting the digitized AV sample 313 at predetermined timing intervals corresponding to the location of header 215 detected by audio detection module 304. In some embodiments, audio extraction arbitrator 305 may be configured to convert the extracted audio data, back to an original value with reference to the header level of header 215. In one embodiment, audio extraction arbitrator 305 utilizes the header level for recovering a DC offset value added onto the quantized audio data 103 during transmission. Doing so will prevent the quantized audio data from being identified as a horizontal sync signal as the signal swings low. Next, audio extraction module 306 may be configured to transmit the restored audio data samples to buffer 303 for later retrieval. In one embodiment, Audio extraction 306 may include a local audio clock generator (not shown in FIG. 3) with the same corresponding audio sampling frequency as adopted on the transmitter side. In some embodiments, reconstructing the continuous audio signal includes using a predetermined audio sampling rate corresponding to a sampling rate of an upstream audio encoder (e.g., audio encoder system 200), and wherein an order of the one or more of the quantized audio data is not altered by the FIFO buffer.

In one embodiment, audio extraction arbitrator 306 may include clocking functionality for synchronizing the reconstruction of audio data. Audio extraction arbitrator 306 may include one or more digital signal processors (DSP), field programmable gate arrays (FPGA) and or application specific integrated circuits (ASIC). In one embodiment clocking circuitry of audio extraction arbitrator 306 may include one or more of phase locked loop (PLL) clock, a non-PLL clock, a quartz crystal oscillator, and LC resonance tank circuit, alone and/or in combination. Local audio clock circuitry of audio extraction arbitrator 306 may include additional timing and signal conditioning functionality including, for example, fan-out buffers, multipliers and dividers, synthesizers, alone and/or in combination. Local audio clock may be utilized for retrieving audio data from FIFO buffer 306 in a periodic fashion to reconstruct the original audio signal in digital format and output a continuous audio signal 303. However, due to performance limitations of the transmitter and receiver clocks, some clock skew may be present causing variation in sampling frequency between the transmitter and receiver, which may require correction.

In some embodiments, the receiver reconstruction clock frequency should be substantially same as the transmitter sampling clock frequency. Substantially same means any difference is negligible. In some embodiments, in the case that the transmitter sampling frequency and receiver sampling frequency are not substantially the same, interpolation of the received data may be performed to reconstruct the original audio signal. Interpolation in this manner eliminates the need for complicated and resource intensive synchronization of audio and video signal, and also eliminates the need to consider the video frame boundary. Interpolation, according to one or more embodiments, also does not require calculating and buffering the audio data based on the frame periodicity. Rather, the difference in sampling frequencies between the transmitter and receiver can be corrected by interpolating the received audio samples in accordance to the differences (e.g., clock skew between receiver and transmitter).

Figure 4:
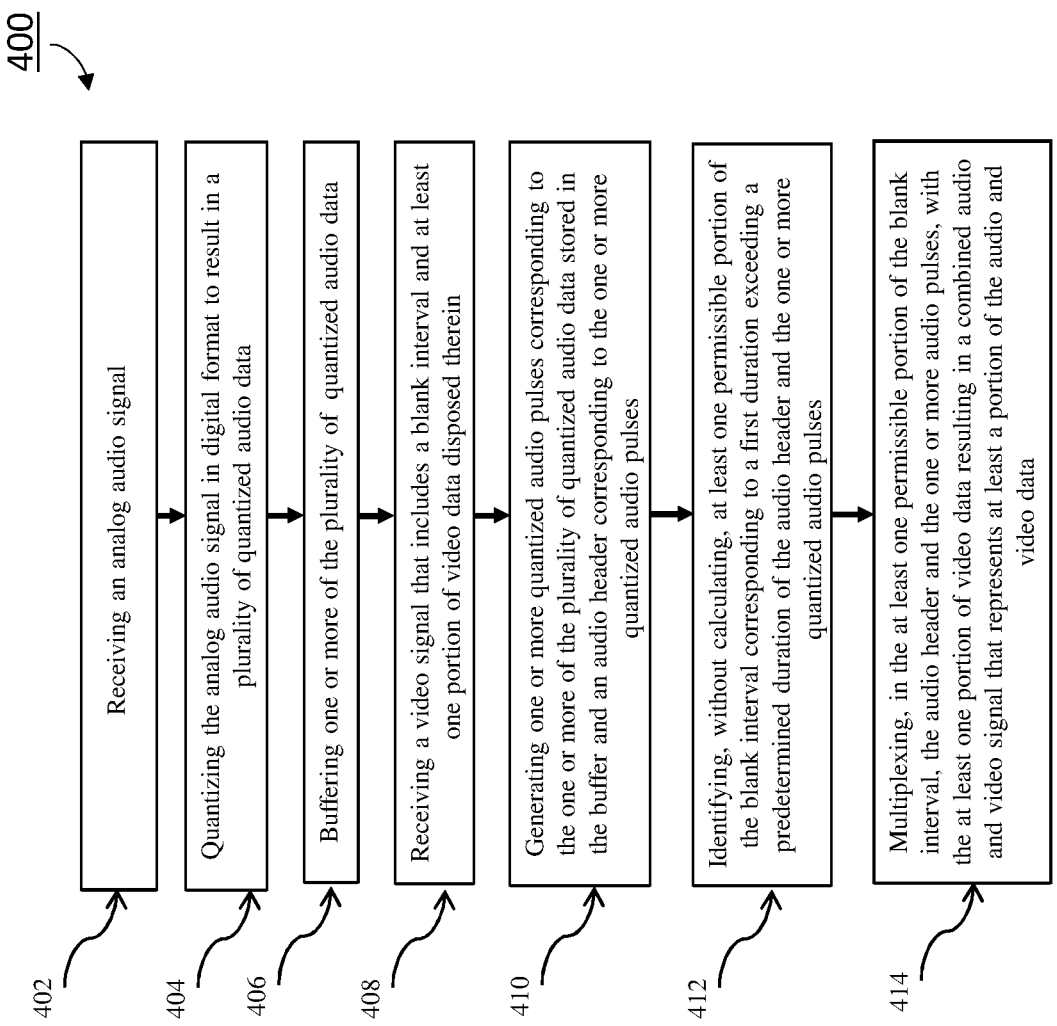
FIG. 4 illustrates a flow chart of a method of transmitting an audio signal data in accordance to one or more embodiments of the invention.

Referring now to FIG. 4, FIG. 4 depicts a flowchart of an exemplary method 400 in accordance with one or more exemplary implementation described herein. Method 400 may begin at an operation 402, receiving an analog audio signal. At an operation 404, quantizing the analog audio signal in digital format. At an operation 406, buffering one or more quantized audio data. At an operation 408, receiving a video signal comprising a blank interval and a video interval. At an operation 410, combining, an audio header and at least a portion of the buffered audio data in the blank interval of the video signal. The method may conclude at an operation 412, converting the combined video signal to analog and transmitting the combined video signal comprising the audio header and at least the portion of the buffered audio data a downstream video receiver wherein the header data is extracted and utilized to restore the analog audio signal.

Figure 5:
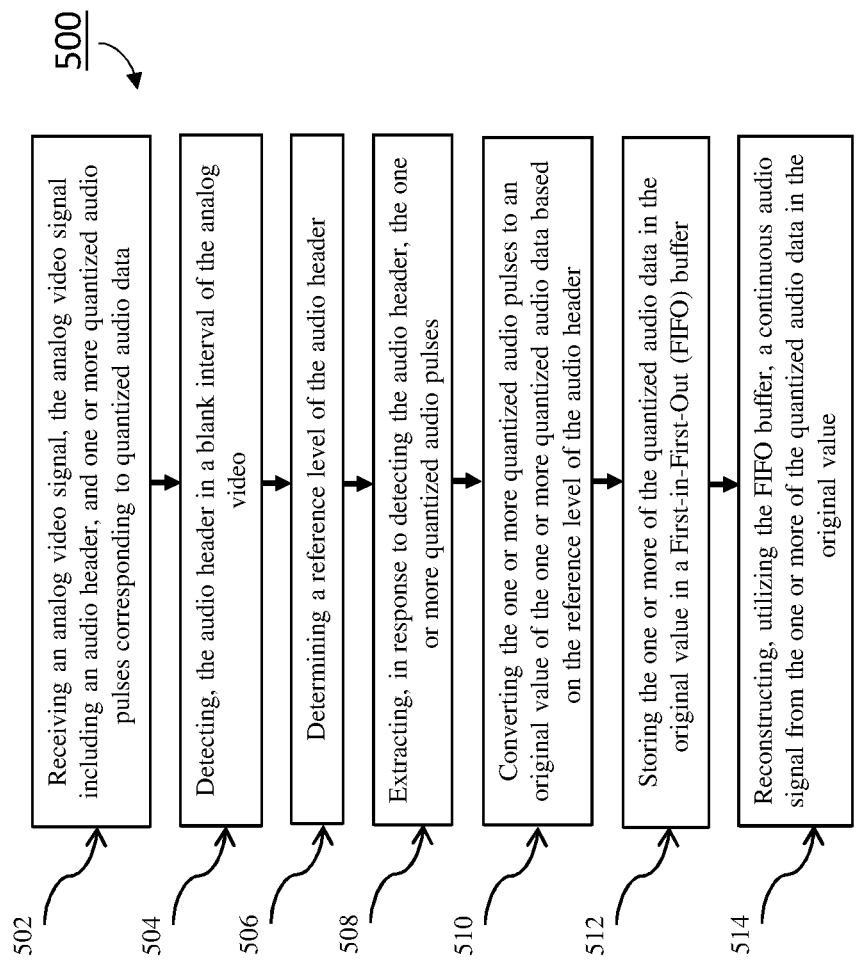
FIG. 5 illustrates a flow chart of a method of receiving an analog video signal in accordance with one or more embodiments of the invention.

Referring now to FIG. 5, FIG. 5 depicts a flowchart of an exemplary method 500 in accordance with one or more exemplary implementation described herein. Method 500 may begin at an operation 502, receiving an analog video signal, the analog video signal including an audio header, and one or more quantized audio pulses corresponding to quantized audio data. At an operation 504, detecting the audio header in a blank interval of the analog video. At an operation 506, determining a reference level of the audio header. At an operation 508, extracting, in response to detecting the audio header, the one or more quantized audio pulses. At an operation 510, converting the one or more quantized audio pulses to an original value of the one or more quantized audio data based on the reference level of the audio header. At an operation 512, storing the one or more of the quantized audio data in the original value in a First-in-First-Out (FIFO) buffer. The method may conclude at an operation 514, reconstructing, utilizing the FIFO buffer, a continuous audio signal from the one or more of the quantized audio data in the original value.

Although the present invention has been particularly described with reference to the preferred embodiments thereof, it should be readily apparent to those of ordinary skill in the art that changes and modifications in the form and details may be made without departing from the spirit and scope of the exemplary embodiments described herein. It is intended that the appended claims encompass such changes and modifications.

What is claimed:

1. A method for receiving audio and video data over a single cable, the method comprising:
   receiving, by a downstream receiver, an analog video signal sent by an upstream transmitter, the analog video signal including an audio header, and one or more quantized audio pulses corresponding to quantized audio data;
   detecting the audio header in a blank interval of the analog video;
   determining a reference level of the audio header;
   extracting, in response to detecting the audio header, the one or more quantized audio pulses;
   converting the one or more quantized audio pulses to an original value of the one or more quantized audio data based on the reference level of the audio header;
   storing the one or more of the quantized audio data in the original value in a First-in-First-Out (FIFO) buffer;
   determining an interpolation of the received one or more quantized audio pulses in accordance with a clock skew between the upstream transmitter and the downstream receiver; and
   periodically retrieving, based on the interpolation, the one or more quantized audio data in the original value from the FIFO buffer; and
   reconstructing, a continuous audio signal from the one or more quantized audio data in the original value.

2. The method of claim 1, wherein the audio header is configured to indicate a presence of the one or more quantized audio pulses.

3. The method of claim 1, wherein the audio header includes a value level corresponding to an audio DC offset during transmission.

4. The method of claim 3, wherein the downstream receiver utilizes the value level for detection of valid audio data and restoring the analog audio signal.

5. A method of receiving audio and video data over a single cable, the method comprising:
   receiving, by a downstream receiver an analog video signal sent by an upstream transmitter, the analog video signal including an audio header, and one or more quantized audio pulses corresponding to quantized audio data;
   detecting the audio header in a blank interval of the analog video;
   determining a reference level of the audio header;
   extracting, in response to detecting the audio header, the one or more quantized audio pulses;
   converting the one or more quantized audio pulses to an original value of the one or more quantized audio data based on the reference level of the audio header;
   storing the one or more of the quantized audio data in the original value in a First-in-First-Out (FIFO) buffer; and
   reconstructing, utilizing the FIFO buffer, a continuous audio signal from the one or more of the quantized audio data in the original value wherein reconstruction the continuous audio signal from the FIFO buffer includes:
   generating a first clock with a substantially same frequency as a sampling rate of the upstream transmitter,
   periodically retrieving from the FIFO buffer, based on the first clock, the one or more quantized audio data in the original value.

6. The method of claim 5, wherein reconstructing the continuous audio signal includes using a predetermined audio sampling rate corresponding to the sampling rate of the upstream audio encoder, and wherein an order of the one or more of the quantized audio data is not altered by the FIFO buffer.

7. The method of claim 5, wherein detecting the presence of the audio header includes utilizing information from a sync slicer function of a video decoder to aid the detection of the audio header at one or more predefined locations and/or time intervals according to the video transmission protocol.

8. The method of claim 5, wherein the audio frequency values comprise 8 KHz, 16 KHz, or 32 KHz.

9. The method of claim 5, wherein the audio header is configured to indicate a presence of the one or more quantized audio pulses.

10. The method of claim 5, wherein the audio header includes a value level corresponding an audio DC offset during transmission.

11. The method of claim 10, wherein reconstructing the continuous audio signal includes utilizing the value level for detection of valid audio data and reconstruction of the analog audio signal is based on the audio DC offset.

12. A system for receiving audio and video data over a single cable, the system comprising a First-in-First-Out (FIFO) buffer, an upstream encoder and a downstream decoder in communication over the single cable, wherein the downstream decoder is configured for:
- receiving an analog video signal sent by the upstream encoder over the single cable, the analog video signal including an audio header, and one or more quantized audio pulses corresponding to quantized audio data;
- detecting the audio header in a blank interval of the analog video;
- determining a reference level of the audio header;
- extracting, in response to detecting the audio header, the one or more quantized audio pulses;
- converting the one or more quantized audio pulses to an original value of the one or more quantized audio data based on the reference level of the audio header;
- storing the one or more of the quantized audio data in the original value in the FIFO buffer;
- determining an interpolation of the received one or more quantized audio pulses in accordance with a clock skew between the upstream encoder and the downstream decoder; and
- periodically retrieving, based on the interpolation, the one or more quantized audio data in the original value from the FIFO buffer; and
- reconstructing, a continuous audio signal from the one or more quantized audio data in the original value.

13. A system for receiving audio and video data over a single cable, the system comprising a First-in-First-Out (FIFO) buffer, an upstream encoder in communication with a downstream decoder via the single cable, wherein the downstream decoder is configured for:
- receiving, an analog video signal sent by the upstream encoder over the single cable, the analog video signal including an audio header, and one or more quantized audio pulses corresponding to quantized audio data;
- detecting, the audio header in a blank interval of the analog video;
- determining a reference level of the audio header;
- extracting, in response to detecting the audio header, the one or more quantized audio pulses;
- converting the one or more quantized audio pulses to an original value of the one or more quantized audio data based on the reference level of the audio header;
- storing the one or more of the quantized audio data in the original value in the FIFO buffer;
- generating a first clock with a substantially same frequency as a sampling rate of the upstream encoder,
- periodically retrieving from the FIFO buffer, based on the first clock, the one or more quantized audio data in the original value; and
- reconstructing, a continuous audio signal from the one or more quantized audio data in the original value.

* * * * *